United States Patent [19]

Shibuya

[11] 4,396,254
[45] Aug. 2, 1983

[54] F·θ LENS

[75] Inventor: Masato Shibuya, Kawasaki, Japan

[73] Assignee: Nippon Kogaku K.K., Tokyo, Japan

[21] Appl. No.: 235,087

[22] Filed: Feb. 17, 1981

[30] Foreign Application Priority Data

Mar. 4, 1980 [JP] Japan ................................. 55-26087

[51] Int. Cl.³ ...................... G02B 13/22; G02B 9/62; G02B 9/64
[52] U.S. Cl. .................................. 350/463; 350/415; 350/464
[58] Field of Search ................ 350/463, 469, 464, 6.8, 350/449, 415

[56] References Cited

U.S. PATENT DOCUMENTS 2,687,063  8/1954  Coleman ............................ 350/415
3,351,412  11/1967  Solisch et al. .................... 350/463
4,277,128  7/1981  Kawamura ......................... 350/6.8

Primary Examiner—John K. Corbin
Assistant Examiner—Paul M. Dzierzynski
Attorney, Agent, or Firm—Shapiro and Shapiro

[57] ABSTRACT

An f·θ lens includes, in succession from the incident light side, a first group having a negative refractive power, a second group having a meniscus lens component having its convex surface facing the incident light side, a third group having a meniscus lens component having its convex surface facing the emergent light side, and a fourth group having a positive refractive power.

8 Claims, 3 Drawing Figures

F·θ LENS

BACKGROUND OF THE INVENTION

1. Field of the Invention

This invention relates to improvements in a so-called f·θ lens used in an optical scanning system.

2. Description of the Prior Art

Generally, in laser beam scanning systems, use is made of a so-called f·θ lens in which the image height is given by f·θ where f is the focal length of the lens and θ is the angle of view (the angle which an incident parallel light beam forms with the optical axis) so that the scanning velocity of the parallel light beam by rotation of a reflecting member or the like and the movement velocity of an image (a point whereat the parallel light beam is condensed) are in proportional relationship.

A laser light which effects scanning by the use of such an f·θ lens includes much infrared light or ultraviolet light and where use is made of such light which is not directly visible to the eyes, inconveniences have been caused in the adjustment during manufacture or the setting of the apparatus when actually used. In fact, there have been required f·θ lenses which are widely applicable by enabling laser light of two wavelengths to be used.

SUMMARY OF THE INVENTION

It is an object of the present invention to eliminate the above-noted inconveniences and to provide an f·θ lens which fully satisfies the linearity of distortion for f·θ, spherical aberration, curvature of image field, astigmatism, coma, etc. heretofore required of the conventional f·θ lens to satisfy the above-noted requirement and yet which has been achromatized.

The invention will become fully apparent from the following detailed description thereof taken in conjunction with the accompanying drawings.

DESCRIPTION OF THE PREFERRED EMBODIMENTS

Figure 1:
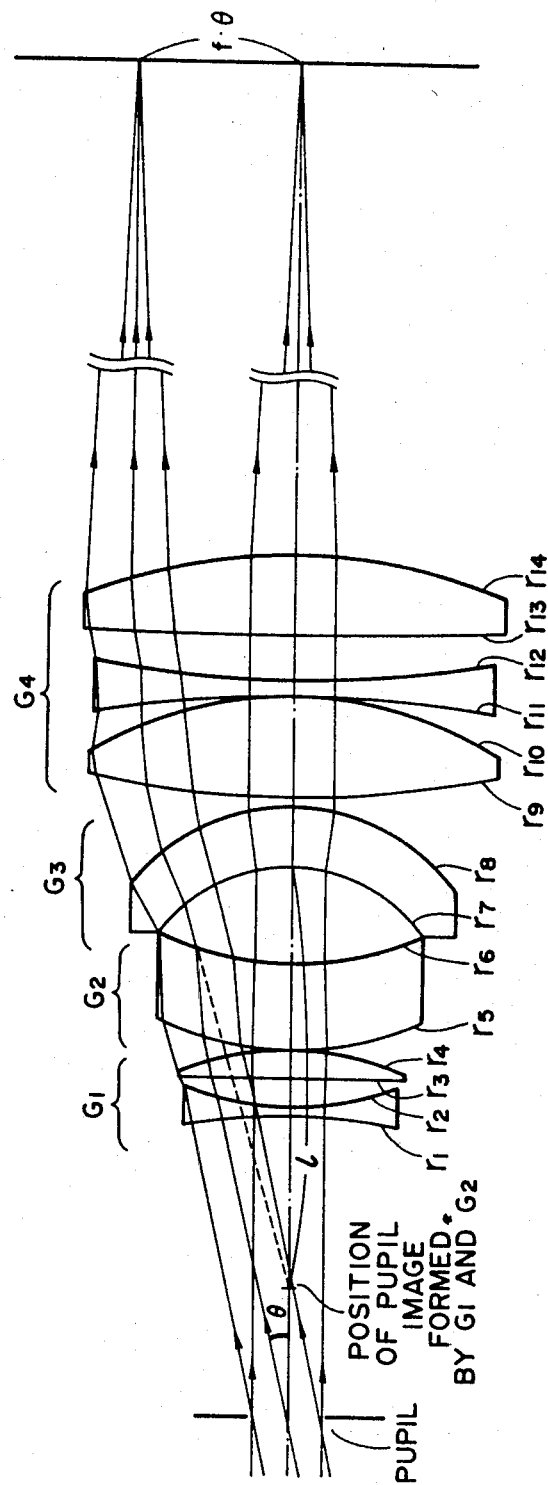
FIG. 1 shows the lens arrangement according to a first embodiment of the present invention.

The f·θ lens according to the present invention has, in succession from the incident light side, a first group $G_1$ having a negative refractive power as a whole, a second group $G_2$ including a meniscus lens having its convex surface facing the incident light side, a third group $G_3$ including a meniscus lens having its convex surface facing the emergent light side, and a fourth group $G_4$ having a positive refractive power as a whole, and the pupil of the entire system is positioned on the incident light side. The f·θ lens satisfies the following conditions:

$$|r_8| > |r_7| \tag{1}$$
$$l > |r_7| \tag{2}$$
$$1.0 \leq \frac{|r_7| + d_7}{|r_8|} < 1.2 \tag{3}$$

-continued
$$0.8 < \frac{r_6}{r_5} < 1.1 \tag{4}$$

where $r_5$ and $r_6$ represent the curvature radii of the second group $G_2$ on the incident light side and the emergent light side, $r_7$ and $r_8$ represent the curvature radii of the third group $G_3$ on the incident light side and the emergent light side, $d_7$ represents the center thickness of the third group $G_3$, and $l$ represents the distance from the image position of the pupil of the entire lens system formed by the first group $G_1$ and the second group $G_2$ to the surface of the third group $G_3$ which is adjacent to the incident light side.

Generally, achromatism of a lens system is such that if there is little or no dispersion of each glass or if each small portion is completely achromatized, the lens as a whole is also substantially achromatic, but actually this is difficult to realize because other aberrations must be taken into account. Generally, in a lens system which permits lens components to be disposed forwardly and rearwardly of the pupil, the lens disposed forwardly of the pupil and the lens disposed rearwardly of the pupil differ in their affect on chromatic difference of magnification and axial chromatic aberration and, therefore, these two chromatic aberrations can be corrected relatively easily. However, in the f·θ lens used in an optical scanning system, the pupil lies forwardly of the lens system and all lenses have a similar property with respect to their action on the two chromatic aberrations and, therefore, correction of the two chromatic aberrations is difficult. Further, in the f·θ lens, chromatic difference of magnification must be uniformly small over the whole angle of view and, therefore, said correction is more difficult.

Generally, in a lens or a lens group, axial chromatic aberration increases in proportion to the square of the height of the paraxial ray, and chromatic difference of magnification increases in proportion to the height of the principal ray. In the lens construction of the present invention, when the height of the paraxial ray and the height of the principal ray which is an oblique ray are compared with each other with attention being paid to the first group and the fourth group, the first group acts relatively on axial chromatic aberration and the fourth group acts relatively on chromatic difference of magnification. Therefore, it is desirable that the first group comprises a concave lens and a convex lens differing in dispersion to correct axial chromatic aberration, and it is desirable that the fourth group comprises three components, i.e. a positive lens, a negative lens and a positive lens differing in dispersion, to correct chromatic difference of magnification.

Now, in order to satisfy the relation of f·θ, negative distortion must be produced by intensifying the refractive power of the fourth group and, as a result, the Petzval sum becomes positive and curvature of the image field occurs. To correct this, the refractive indices of the positive lenses in the fourth group may be increased and the refractive index of the negative lens in the fourth group may be decreased, whereas this is limited by the achromatizing conditions. Therefore, in the present invention, the design is such that curvature of the image field is corrected primarily by the third group, and the third group has been made into a substantially concentric circular lens to render the Petzval sum to be in the negative direction. The condition for producing a negative Petzval sum in the third group is given by formula (1) above.

Further, in the fourth group, the strong positive refractive power causes inner coma, but by making the design such that the image of the pupil formed by the first and second groups lies more adjacent to the incident light side than the center of the concentric circle of the third group, outer coma may be produced in the third group by the property of the concentric circular lens thereof and inner coma may be produced in the fourth group, whereby the coma may be well corrected by these two groups. The condition thereof is given by formula (2). The concentric circular property is prescribed by formula (3). If the upper limit of formula (3) is exceeded, the amount of outer coma produced will be too small and, if the lower limit of formula (3) is exceeded, the amount of outer coma produced will be too great and, in any case, it will become difficult to keep a balance in coma between the third group and the fourth group and good correction of coma will be difficult even if these groups ae combined with the other groups.

Further, to make the linearity of $f\cdot\theta$ uniformly good over the whole angle of view, higher order distortion must be balanced to an appropriate amount. For that purpose, a meniscus lens comprising two surfaces substantially equal in radius of curvature and having little or no refractive power is used as the second group. This utilizes the property that with respect to a principal ray incident on a parallel flat plate at an incidence angle of $\theta$, astigmatism and curvature of image field are a function of $\theta^2$ while distortion is a function of $\theta^3$. In accordance with this principle, a meniscus lens whose two surfaces are substantially equal in radius of curvature and which faces in the opposite direction to the third group is used as the second group, whereby it is possible to correct high order distortion. Formula (4) is the condition for enabling appropriate correction to be accomplished, and if the upper limit of this condition is exceeded, negative distortion will occur excessively and, if the lower limit of this condition is exceeded, positive distortion will occur excessively, and the correction in the other portions will become difficult.

As a result of the design having been made on the basis of such a basic point of view, light ray aberration stays substantially within a diffraction limit at the best image plane position and the linearity of $f\cdot\theta$ can be controlled to an error less than 0.02% even when chromatic difference of magnification is taken into account. Further, the angle which the principal ray of the oblique rays forms with the optical axis after having left the lens can be made less than 0.7°, which results in a sufficiently telecentric system.

The lens construction according to an embodiment of the present invention as described above is shown in FIG. 1.

The embodiment, as shown in FIG. 1, comprises four groups, namely, a first group $G_1$ comprising a biconcave negative lens and a positive meniscus lens convex to the emergent light side and having a negative refractive power as a whole, a second group $G_2$ comprising a meniscus lens comprising two surfaces substantially equal in radius of curvature and having its convex surface facing the incident light side and having little or no refractive power, a third group $G_3$ comprising a meniscus lens of concentric circular shape having its convex surface facing the emergent light side, and a fourth group $G_4$ comprising a biconvex positive, a biconcave negative and a positive lens and having a positive refractive power as a whole.

Numerical data of a first and a second embodiment of the present invention will be shown below. In the tables below, $r_1, r_2, \ldots$ represent the radii of curvature of the respective lens surfaces, $d_1, d_2, \ldots$ represent the center thicknesses of and air spaces between the respective lenses, $n_1, n_2, \ldots$ and $\nu d_1, \nu d_2, \ldots$ represent the refractive indices for a light ray of wavelength 1064 nm and the Abbe numbers for d-line ($\lambda = 587.6$ nm), respectively, of the respective lenses. The subscripts represent the order from the incident light side.

| First Embodiment | | |
|---|---|---|
| Focal length: $f = 247.5$ | Back focal length $Bf = 304.4$ | The pupil lies at 90mm from the first surface toward the incident light side |
| $r_1 = -212.400$ | $d_1 = 4.0$ | $n_1 = 1.51051 \quad \nu d_1 = 70.0$ |
| $r_2 = 100.420$ | $d_2 = 7.5$ | |
| $r_3 = -1390.000$ | $d_3 = 9.0$ | $n_2 = 1.56620 \quad \nu d_2 = 40.8$ |
| $r_4 = -92.770$ | $d_4 = 0.5$ | |
| $r_5 = 99.265$ | $d_5 = 25.0$ | $n_3 = 1.53546 \quad \nu d_3 = 53.6$ |
| $r_6 = 96.500$ | $d_6 = 28.0$ | |
| $r_7 = -51.909$ | $d_7 = 19.1$ | $n_4 = 1.77442 \quad \nu d_4 = 25.5$ |
| $r_8 = -64.660$ | $d_8 = 2.5$ | |
| $r_9 = 294.150$ | $d_9 = 30.0$ | $n_5 = 1.49339 \quad \nu d_5 = 81.9$ |
| $r_{10} = -118.300$ | $d_{10} = 0.4$ | |
| $r_{11} = -435.938$ | $d_{11} = 4.0$ | $n_6 = 1.77442 \quad \nu d_6 = 25.5$ |
| $r_{12} = 274.848$ | $d_{12} = 13.8$ | |
| $r_{13} = 1411.027$ | $d_{13} = 25.0$ | $n_7 = 1.49339 \quad \nu d_7 = 81.9$ |
| $r_{14} = -155.430$ | $(d_{14} = 304.4095)$ | |

| Second Embodiment | | |
|---|---|---|
| Focal length: $f = 247.7$ | Back focal length $Bf = 325.564$ | The pupil lies at 90 mm from the first surface toward the incident light side |
| $r_1 = -183.75849$ | $d_1 = 4.7318$ | $n_1 = 1.50853 \quad \nu d_1 = 70.1$ |
| $r_2 = 94.38621$ | $d_2 = 7.5000$ | |
| $r_3 = -483.85555$ | $d_3 = 8.55299$ | $n_2 = 1.56576 \quad \nu d_2 = 40.8$ |
| $r_4 = -91.36716$ | $d_4 = 0.39469$ | |
| $r_5 = 97.88500$ | $d_5 = 27.81541$ | $n_3 = 1.53580 \quad \nu d_3 = 53.6$ |
| $r_6 = 105.00000$ | $d_6 = 28.000$ | |
| $r_7 = -55.93444$ | $d_7 = 20.58637$ | $n_4 = 1.77390 \quad \nu d_4 = 25.4$ |
| $r_8 = -68.25397$ | $d_8 = 2.62010$ | |
| $r_9 = 302.32980$ | $d_9 = 34.79525$ | $n_5 = 1.49132 \quad \nu d_5 = 82.3$ |
| $r_{10} = -123.01617$ | $d_{10} = 0.39228$ | |
| $r_{11} = -466.47533$ | $d_{11} = 3.09517$ | $n_6 = 1.77390 \quad \nu d_6 = 25.4$ |
| $r_{12} = 254.84433$ | $d_{12} = 11.26293$ | |
| $r_{13} = 496.78675$ | $d_{13} = 19.74862$ | $n_7 = 1.49136 \quad \nu d_7 = 82.3$ |
| $r_{14} = -171.15637$ | $(d_{14} = 325.56436)$ | |

In both of the above embodiments, glasses of the same refractive index and the same dispersion are used for the two convex lenses in the fourth group, whereas of course, this is not restrictive.

Figure 2:
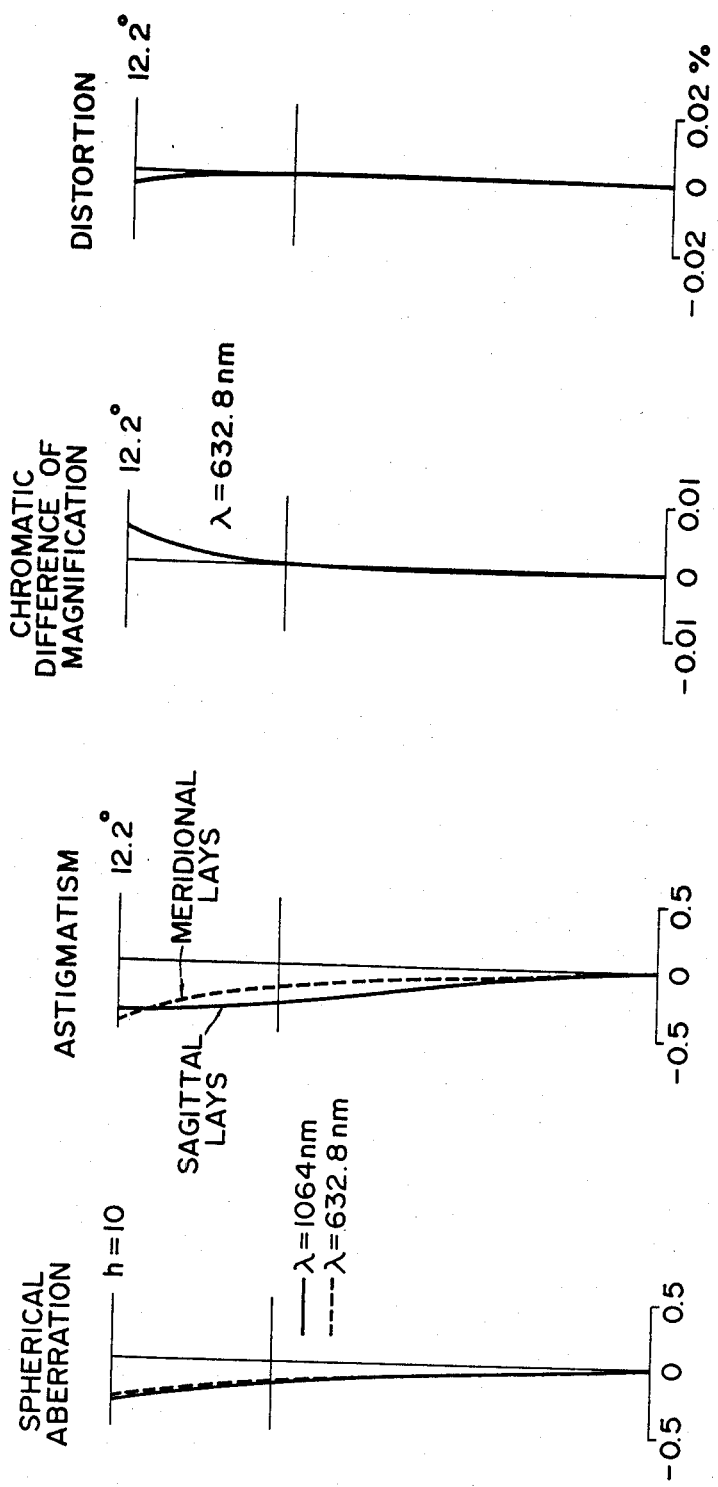
FIG. 2 illustrates the various aberrations in the first embodiment.
Figure 3:
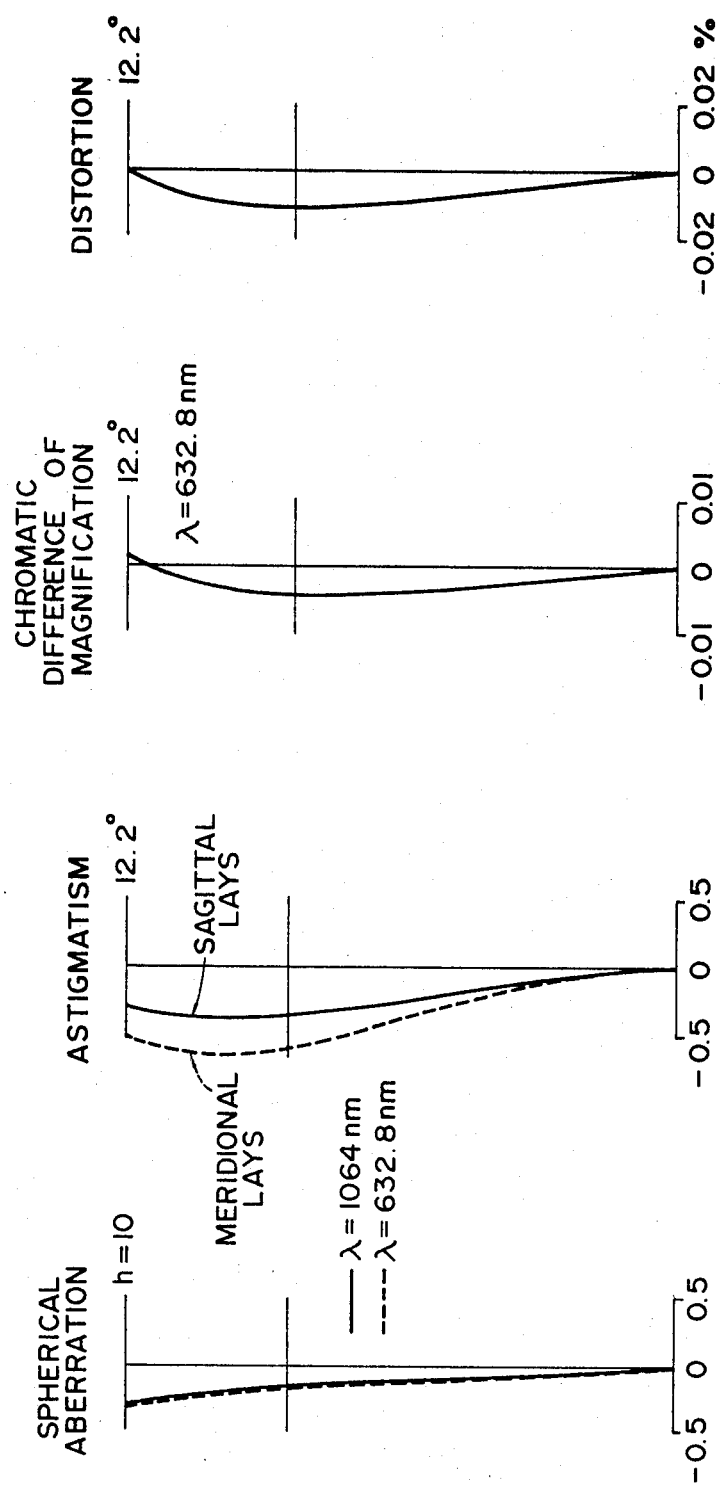
FIG. 3 illustrates the various aberrations in a second embodiment.

The lenses of the above two embodiments are telecentric on the emergent light side, as shown in FIG. 1, and even if the scanned surface is concavo-convex and even if the scanned surface is moved, the scanning speed can be kept constant and the linearity of $f\cdot\theta$ can be maintained. The various aberrations in the first and second embodiments are shown in FIGS. 2 and 3, respectively. From these Figures, it is seen that in both embodiments, on-axis chromatic aberration and chromatic difference of magnification are well corrected for the two wavelengths $\lambda = 1064$ nm and $\lambda = 632.8$ nm and that distortion causing error from the relationship $f\cdot\theta$ is also very well corrected. As regards chromatic difference of magnification, the amount of aberration for short wavelength with long wavelength as the standard is shown.

According to the present invention, as described above, an achromatized excellent f·θ lens is achieved.

I claim:

1. An f·θ lens having a total focal length f for condensing an incident light ray angled at θ with respect to the optical axis to a position of distance f·θ from the optical axis while substantially maintaining telecentricity and in which a pupil of the entire lens lies on the incident light side of the lens, said f·θ lens comprising, in succession from the incident light side:

a negative lens group having a composite negative refractive power and being disposed most adjacent to the pupil;

a first meniscus lens component having its convex surface facing the incident light side and having two lens surfaces of substantially equal radius of curvature;

a second meniscus lens component having its convex surface facing the emergent light side and having a substantially concentric circular shape; and a positive lens group having a composite positive refractive power.

2. An f·θ lens according to claim 1, satisfying the following conditions:

$$|r_8| > |r_7| \tag{1}$$

$$l > |r_7| \tag{2}$$

$$1.0 \leq \frac{|r_7| + d_7}{|r_8|} < 1.2 \tag{3}$$

$$0.8 < \frac{r_6}{r_5} < 1.1 \tag{4}$$

where $r_5$ and $r_6$ represent the radii of curvature of the surfaces of the first meniscus lens component which are adjacent to the incident light side and the emergent light side, respectively, $r_7$ and $r_8$ represent the radii of curvature of the surfaces of the second meniscus lens component which are adjacent to the incident light side and the emergent light side, respectively, $d_7$ represents the center thickness of the second meniscus lens component, and $l$ represents the distance from the image of said pupil formed by said negative lens group and said first meniscus lens component to the surface of the second meniscus lens component which is adjacent to the incident light side.

3. An f·θ lens according to claim 2, wherein said negative lens group includes, in succession from the incident light side, a biconcave negative lens component and a positive lens component, and said positive lens group includes, in succession from the incident light side, a positive lens, a negative lens and a positive lens.

4. An f·θ lens according to claim 3, wherein numerical data are as follows:

| Focal length: $f = 247.5$ | Back focal length $B_f = 304.4$ | The pupil lies at 90mm from the first surface toward the incident light side | |
|---|---|---|---|
| $r_1 = -212.400$ | $d_1 = 4.0$ | $n_1 = 1.51051$ | $vd_1 = 70.0$ |
| $r_2 = 100.420$ | $d_2 = 7.5$ | | |
| $r_3 = -1390.000$ | $d_3 = 9.0$ | $n_2 = 1.56620$ | $vd_2 = 40.8$ |
| $r_4 = -92.770$ | $d_4 = 0.5$ | | |
| $r_5 = 99.265$ | $d_5 = 25.0$ | $n_3 = 1.53546$ | $vd_3 = 53.6$ |
| $r_6 = 96.500$ | $d_6 = 28.0$ | | |
| $r_7 = -51.909$ | $d_7 = 19.1$ | $n_4 = 1.77442$ | $vd_4 = 25.5$ |
| $r_8 = -64.660$ | $d_8 = 2.5$ | | |
| $r_9 = 294.150$ | $d_9 = 30.0$ | $n_5 = 1.49339$ | $vd_5 = 81.9$ |
| $r_{10} = -118.300$ | $d_{10} = 0.4$ | | |
| $r_{11} = -435.938$ | $d_{11} = 4.0$ | $n_6 = 1.77442$ | $vd_6 = 25.5$ |
| $r_{12} = 274.848$ | $d_{12} = 13.8$ | | |
| $r_{13} = 1411.027$ | $d_{13} = 25.0$ | $n_7 = 1.49339$ | $vd_7 = 81.9$ |
| $r_{14} = -155.430$ | $(d_{14} = 304.4095)$ | | | where $r_1, r_2, \ldots$ represent the curvature radii of the respective lens surfaces, $d_1, d_2, \ldots$ represent the center thicknesses and air spaces of the respective lenses, $n_1, n_2, \ldots$ and $vd_1, vd_2, \ldots$ represent the refractive indices for the light ray of wavelength 1064 nm and the Abbe numbers for d-line, respectively, of the respective lenses, and the subscripts represent the order from the incident light side.

5. An f·θ lens according to claim 3, wherein numerical data are as follows:

| Focal length: $f = 247.7$ | Back focal length $B_f = 325.564$ | The pupil lies at 90mm from the first surface toward the incident light side | |
|---|---|---|---|
| $r_1 = -183.75849$ | $d_1 = 4.7318$ | $n_1 = 1.50853$ | $vd_1 = 70.1$ |
| $r_2 = 94.38621$ | $d_2 = 7.5000$ | | |
| $r_3 = -483.85555$ | $d_3 = 8.55299$ | $n_2 = 1.56576$ | $vd_2 = 40.8$ |
| $r_4 = -91.36716$ | $d_4 = 0.39469$ | | |
| $r_5 = 97.88500$ | $d_5 = 27.81541$ | $n_3 = 1.53580$ | $vd_3 = 53.6$ |
| $r_6 = 105.00000$ | $d_6 = 28.000$ | | |
| $r_7 = -55.93444$ | $d_7 = 20.58637$ | $n_4 = 1.77390$ | $vd_4 = 25.4$ |
| $r_8 = -68.25397$ | $d_8 = 2.62010$ | | |
| $r_9 = 302.32980$ | $d_9 = 34.79525$ | $n_5 = 1.49132$ | $vd_5 = 82.3$ |
| $r_{10} = -123.01617$ | $d_{10} = 0.39228$ | | |
| $r_{11} = -466.47533$ | $d_{11} = 3.09517$ | $n_6 = 1.77390$ | $vd_6 = 25.4$ |
| $r_{12} = 254.84433$ | $d_{12} = 11.26293$ | | |
| $r_{13} = 496.78675$ | $d_{13} = 19.74862$ | $n_7 = 1.49136$ | $vd_7 = 82.3$ |
| $r_{14} = -171015637$ | $(d_{14} = 325.56436)$ | | | where $r_1, r_2, \ldots$ represent the curvature radii of the respective lens surfaces, $d_1, d_2, \ldots$ represent the center thicknesses and air spaces of the respective lenses, $n_1, n_2, \ldots$ and $vd_1, vd_2, \ldots$ represent the refractive indices for the light ray of wavelength 1064 nm and the Abbe numbers for d-line, respectively, of the respective lenses, and the subscripts represent the order from the incident light side.

6. A telecentric f·θ lens having a pupil of the entire lens on the incident light side thereof and having a total focal length f for condensing an incident light ray angled at θ with respect to the optical axis to a position of distance f·θ from the optical axis, said f·θ lens comprising a first meniscus lens component convex toward the pupil and having surfaces of substantially equal radius of curvature for compensating for higher order distortion, a second meniscus lens component concave toward the pupil and having two surfaces of concentric circular shape and being disposed at the emergent light side of the first meniscus lens component for compensating Petzval sum and coma, said two meniscus lens components being disposed adjacent to each other with the concave surfaces thereof facing each other, a compositely negative lens group disposed on that side of said first meniscus lens component which is adjacent to the incident light side, and a compositely positive lens group disposed on that side of said second meniscus lens component which is adjacent to the emergent light side for producing negative distortion inherent in the f·θ lens.

7. A telecentric f·θ lens according to claim 6, wherein said compositely negative lens group includes a negative lens and a positive lens differing in dispersion for mainly compensating axial chromatic aberration, and said compositely positive lens group includes a positive lens, a negative lens and a positive lens for mainly compensating chromatic difference of magnification.

8. A telecentric f·θ lens according to claim 6 that satisfies the following conditions:

$$|r_8| > |r_7| \quad (1)$$
$$l > |r_7| \quad (2)$$
$$1.0 \leq \frac{|r_7| + d_7}{|r_8|} < 1.2 \quad (3)$$
$$0.8 < \frac{r_6}{r_5} < 1.1 \quad (4)$$

where $r_5$ and $r_6$ represent the radii of curvature of the surfaces of the first meniscus lens component which are adjacent to the incident light side and the emergent-light side, respectively, $r_7$ and $r_8$ represent the radii of curvature of the surfaces of the second meniscus lens component which are adjacent to the incident light side and the emergent light side, respectively, $d_7$ represents the center thickness of the second meniscus lens component, and l represents the distance from the image of said pupil formed by said negative lens group and said first meniscus lens component to the surface of the second meniscus lens component which is adjacent to the incident light side.

\* \* \* \* \*